(12) United States Patent
Janky

(10) Patent No.: US 6,266,536 B1
(45) Date of Patent: Jul. 24, 2001

(54) SYSTEM AND METHOD FOR DYNAMIC OVERLAP COMPENSATION IN A SIMULCAST NETWORK

(75) Inventor: William O. Janky, Goode, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/303,914

(22) Filed: May 3, 1999

(51) Int. Cl.[7] .................................................. H04B 7/01
(52) U.S. Cl. ............................................ 455/503; 455/502
(58) Field of Search .................................. 455/502, 503, 455/504, 505, 31.3, 67.6, 501, 38.1, 69, 67.1, 67.3

(56) References Cited

U.S. PATENT DOCUMENTS

| | | | |
|---|---|---|---|
| 4,255,814 | * 3/1981 | Osborn | 455/503 |
| 4,696,052 | * 9/1987 | Breeden | 455/503 |
| 5,172,396 | 12/1992 | Rose, Jr. et al. | 375/107 |
| 5,423,059 | * 6/1995 | LoGalbo et al. | 455/503 |
| 5,594,761 | 1/1997 | Brown | 375/356 |
| 5,734,985 | * 3/1998 | Ito et al. | 455/503 |
| 5,873,044 | * 2/1999 | Goldberg et al. | 455/503 |
| 5,963,868 | * 10/1999 | Back | 455/503 |
| 6,011,977 | * 1/2000 | Brown et al. | 455/503 |

* cited by examiner

Primary Examiner—Vivian Chang
Assistant Examiner—Duc Nguyen
(74) Attorney, Agent, or Firm—Jenkens & Gilchrist, P.C.

(57) ABSTRACT

A telecommunications system and method is disclosed for deliberately producing synchronous timing jitters in order to dynamically shift the delay spread within the overlap zone in a simulcast system. At a synchronous periodic rate, the timing differential between transmission of the signal from the control point to each of the transmitters can be continuously adjusted to continuously change the relative timing between multiple received signals in the overlap zone. Alternatively, the timing adjustments can be performed only upon reception of a retransmission request. In either case, the timing adjustments are performed so as to not be noticed by the mobile subscriber.

16 Claims, 4 Drawing Sheets

SYSTEM AND METHOD FOR DYNAMIC OVERLAP COMPENSATION IN A SIMULCAST NETWORK

BACKGROUND OF THE PRESENT INVENTION

FIELD OF THE INVENTION

The present invention relates generally to telecommunications systems and methods for simultaneously broadcasting a signal from multiple transmitters in a mobile radio network, and specifically to compensating for overlap between simulcast signals in a simulcast radio network.

BACKGROUND AND OBJECTS OF THE PRESENT INVENTION

Simulcast, or Simultaneous Broadcast, is a mobile radio system architecture that uses two or more transmitters operating on a single radio frequency, in which the same information is carried by all of the transmitters, and the coverage area of two or more of the transmitters overlap. Simulcast provides some significant advantages including wide area communications with a limited number of channels without the use of a multisite switch. In addition, a simulcast system provides more efficient use of channels in situations where groups operate in multiple locations. Furthermore, simulcast systems offer seamless roaming within the total simulcast coverage area, provide efficient coverage in areas with difficult terrain and provide improved in-building coverage in some cases due to the multiple transmitter concept.

However, there can be performance issues in simulcast systems, especially when digital voice or digital data is being transmitted. With reference now to FIG. 1 of the drawings, a simulcast system 10 having only two transmitters 24a and 24b is shown. Both transmitters 24a and 24b are connected to a central control point 23, or master base station, which utilizes special circuitry to transmit a signal to each transmitter 24a and 24b for simultaneous broadcast of the signal in a cell 22a and 22b associated with each transmitter 24a and 24b, respectively, using the same radio frequency (RF). Each transmitter 24a and 24b is connected to the control point 23 via a dedicated, phasestable microwave or optic fiber backbone system.

Typically, there is a delay introduced by the control point 23 in the sending of the signal to the various transmitters 24a and 24b depending upon the distance between the control point 23 and the transmitters 24a and 24b. For example, if a first transmitter 24a is 10 kilometers away from the control point 23, while a second transmitter 24b is 20 kilometers away from the control point 23, the control point 23 will delay sending the signal to the first transmitter 24a, so that the signal will arrive at both transmitters at the exact same time. This difference in transmission times is generally referred to as the timing differential.

Theoretically, if a Mobile Station (MS) 20, which is the physical equipment, e.g., a car-mounted mobile radio or other portable radio, used by mobile subscribers to communicate with the mobile radio network 10, each other, and users outside the subscribed network, both wireline and wireless, is located exactly between the two transmitters 24a and 24b, the signal transmitted from each of the transmitters 24a and 24b would be received by the MS 20 at exactly the same time, e.g., digital bits received by both transmitters 24a and 24b would line up exactly. As the MS 20 moves towards the edge of the overlap zone 25, the MS 20 captures the transmission from one of the transmitters, such as transmitter 24b. This "capture zone" can be defined as the area in which the carrier signal (signal strength) of the closer transmitter 24b exceeds the signal strength of the farther transmitter 24a by at least approximately 10 decibels (dB).

However, as the MS 20 moves through the overlap zone 25 from one of the transmitters 24a towards the other of the transmitters 24b, the interference increases. This is due to the fact that a bit transmitted from the closer transmitter 24b would be received by the MS 20 at an earlier time than the same bit would be received by the MS 20 from the farther transmitter 24a. If this time difference (hereinafter referred to as the delay spread) becomes too large, the bits begin to interfere with each other, and the MS 20 may demodulate the bit in error. The bit errors caused by this self-imposed interference manifest themselves as problems such as no access to the system, retransmissions of the signal, loss of audio and/or loss of data.

For example, in the Enhanced Digital Access Communication System (EDACS) system, the two transmitter overlap design parameters allows approximately 30–40 microseconds (usec) of delay spread with capture ratio ranges of 8–12 dB. The system is theoretically designed so that the MS 20 can always receive the signal without significant error. Unfortunately, in reality, most simulcast systems have some overlap regions where the rules are exceeded and the system coverage is severely degraded or unusable. In addition, in some simulcast systems, more than two transmitters overlap, which can amplify this problem. Furthermore, this overlap problem is more severe for higher data rates because the ratio of the size of the overlap zone to the capture zone increases. Thus, for digital radio transmissions such as control channel, digital voice, or data, a simulcast system almost always provides non-uniform coverage.

It is, therefore, an object of the present invention to dynamically shift the delay spread in the overlap zone to reduce interference between simulcast signals.

SUMMARY OF THE INVENTION

The present invention is directed to telecommunications systems and methods for deliberately producing synchronous timing jitters in order to dynamically shift the delay spread in the overlap zone in a simulcast system. At a synchronous periodic rate, the timing differential between transmission of the signal from the control point to each of the transmitters can be continuously adjusted to continuously change the amount of delay spread in the overlap zone. Alternatively, the timing adjustments can be performed only upon reception of a retransmission request. In either case, the timing adjustments are performed so as to not be noticed by the mobile subscriber. In addition, in preferred embodiments of the continuously adjusting embodiment, the timing jitters cycle above and below the optimal timing values determined from the system coverage analysis. Advantageously, the dynamic shifting of the delay spread in the overlap zone can improve signaling, voice quality perception and data transmissions in an otherwise unusable overlap area.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In simulcast systems, the timing differential, e.g., the difference between the time that the control point transmits the signal to two different transmitters, is already precisely controlled, typically using high stability oscillators with synchronization to control the data timing. However, most simulcast systems have some overlap regions where the system coverage is severely degraded or unusable. These overlap regions create areas of non-uniform coverage for digital radio transmissions, such as control information, voice, or data transmissions.

Figure 1:
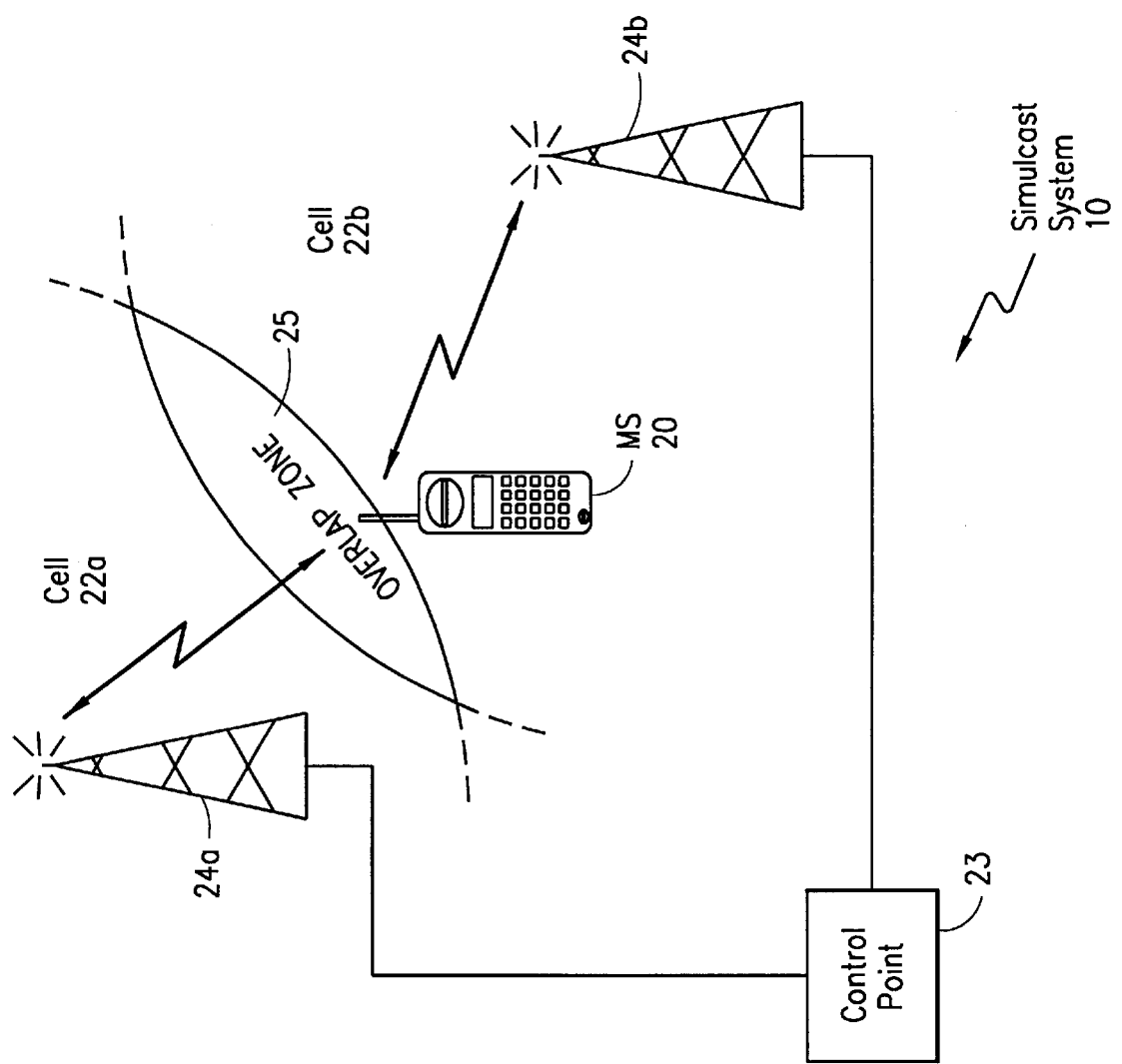
FIG. 1 is a block diagram of a conventional simulcast system.
Figure 2:
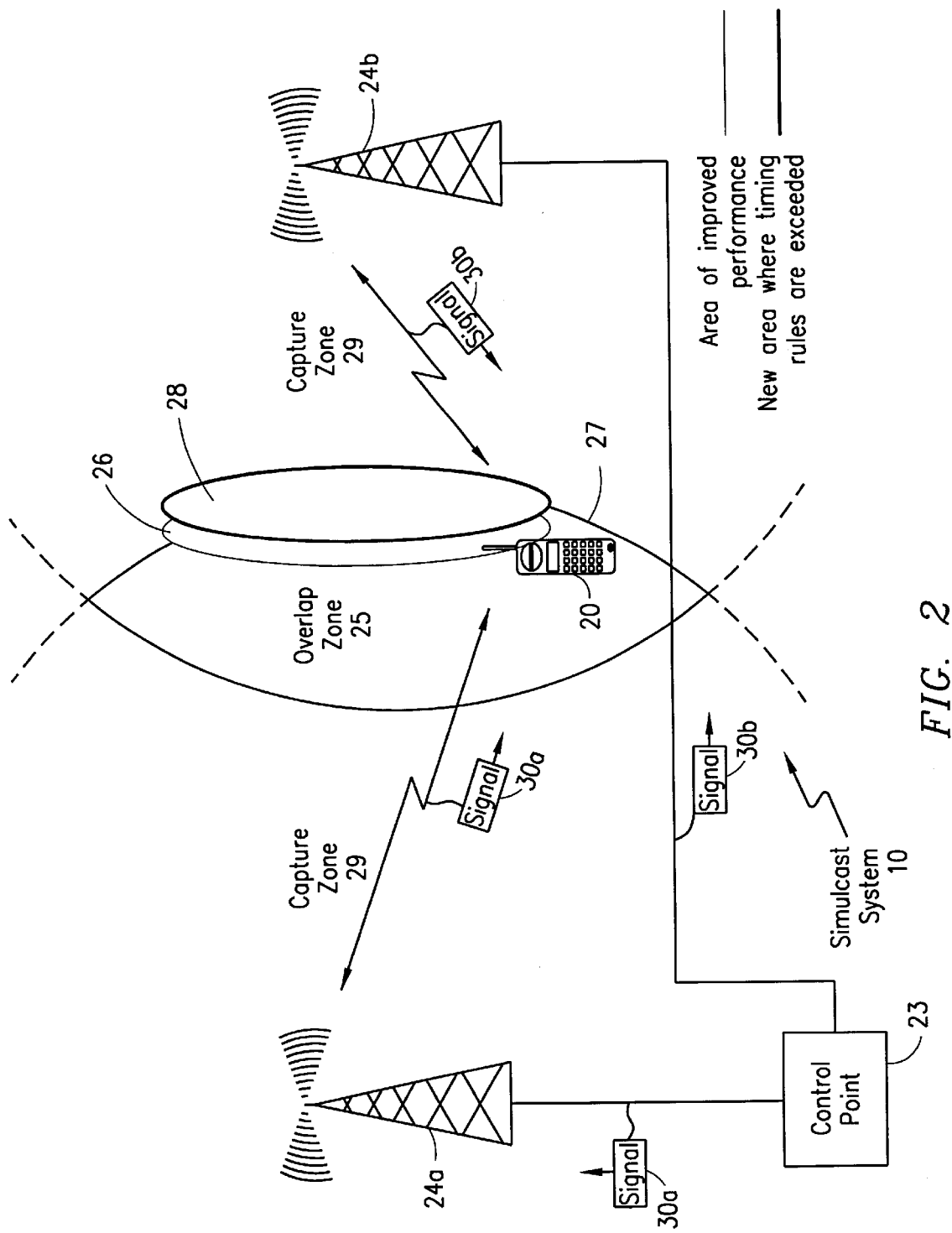
FIG. 2 illustrates the effects of introducing a timing jitter in accordance with preferred embodiments of the present invention.

With reference now to FIG. 2 of the drawings, in order to prevent system 10 coverage from becoming severely degraded or unusable in areas of non-uniform coverage within the overlap zone 25, a synchronous timing jitter can be purposefully introduced by the control point 23 to continuously dynamically shift the delay spread in the overlap zone 25. At a synchronous periodic rate, the difference between the time that the control point 23 transmits the signal 30a to the first transmitter 24a and the time that the control point 23 transmits the signal 30b to the second transmitter 24b can be adjusted to change the delay spread in the overlap zone 25. This new time difference between the times that the control point 23 transmits the signals 30a and 30b to the first and second transmitters 24a and 24b, respectively, is defined as the timing jitter. For example, if the timing between the two transmitters 24a and 24b is shifted by 1 usec, the relative position of a point in the overlap zone 25 where the delay spread limit is exceeded can be moved by approximately 1000 feet.

As shown in FIG. 2 of the drawings, the control point 23 has purposefully adjusted the transmission time so that the transmission of the signal 30b to the second transmitter 24a is delayed by 1 usec as compared to the normal transmission time to the second transmitter 24a. Thus, the relative position of the receiving MS 20 with respect to overlap zone 25 timing parameters has shifted approximately 1000 feet closer to the second transmitter 24a and approximately 1000 feet further from the first transmitter 24b. As stated hereinbefore, normally, the control point 23 synchronizes the transmission of the signals 30a and 30b to the two transmitters 24a and 24b, respectively so that if an MS 20 is located at a point (not shown) exactly between the two transmitters 24a and 24b, e.g., the distance from the MS 20 to the first transmitter 24a is the same as the distance from the MS 20 to the second transmitter 24b, the signals 30a and 30b transmitted from each of the transmitters 24a and 24b would be received by the MS 20 at exactly the same time. However, by introducing the timing jitter, the location at which the MS 20 receives the signals 30a and 30b at exactly the same time has shifted.

As an example, if the MS 20 is originally located at an edge 27 of the overlap zone 25, which is typically the area where the MS 20 would experience the highest interference levels between the two signals 30, and thus, signal degradation, when the timing jitter is introduced, the MS 20 is now located in an area of improved performance 26. Thus, the MS 20 receives the signals 30a and 30b shifted in time, resulting in a reduced delay spread, and thus a higher probability of decoding the signal 30 correctly. It should be understood that by introducing a timing jitter in a simulcast system may improve performance for some users, but may also degrade the performance for other users who were not originally located in an area of excessive timing delay spread 28. Thus, if the MS 20 was originally located in an area where the delay spread was acceptable, when the timing jitter is introduced, the MS 20 may now be in an area where the timing rules are exceeded 28.

However, the timing jitters should improve the overall performance of all of the MS's 20 located within the simulcast system 10 by allowing an acceptable degradation in previously good areas, while providing some coverage in areas previously unserviceable. For example, in a trunked mobile radio system, access through the control channel typically uses an algorithm, such as slotted-Aloha, where multiple retries are performed when no response is received to a service request. In this case, no response would be caused by the mobile radio incorrectly decoding the control channel response due to interference caused by excessive delay spread in the received composite signals. The synchronous timing jitter discussed herein can allow an MS 20 to receive the response correctly after a retry request.

Figure 3:
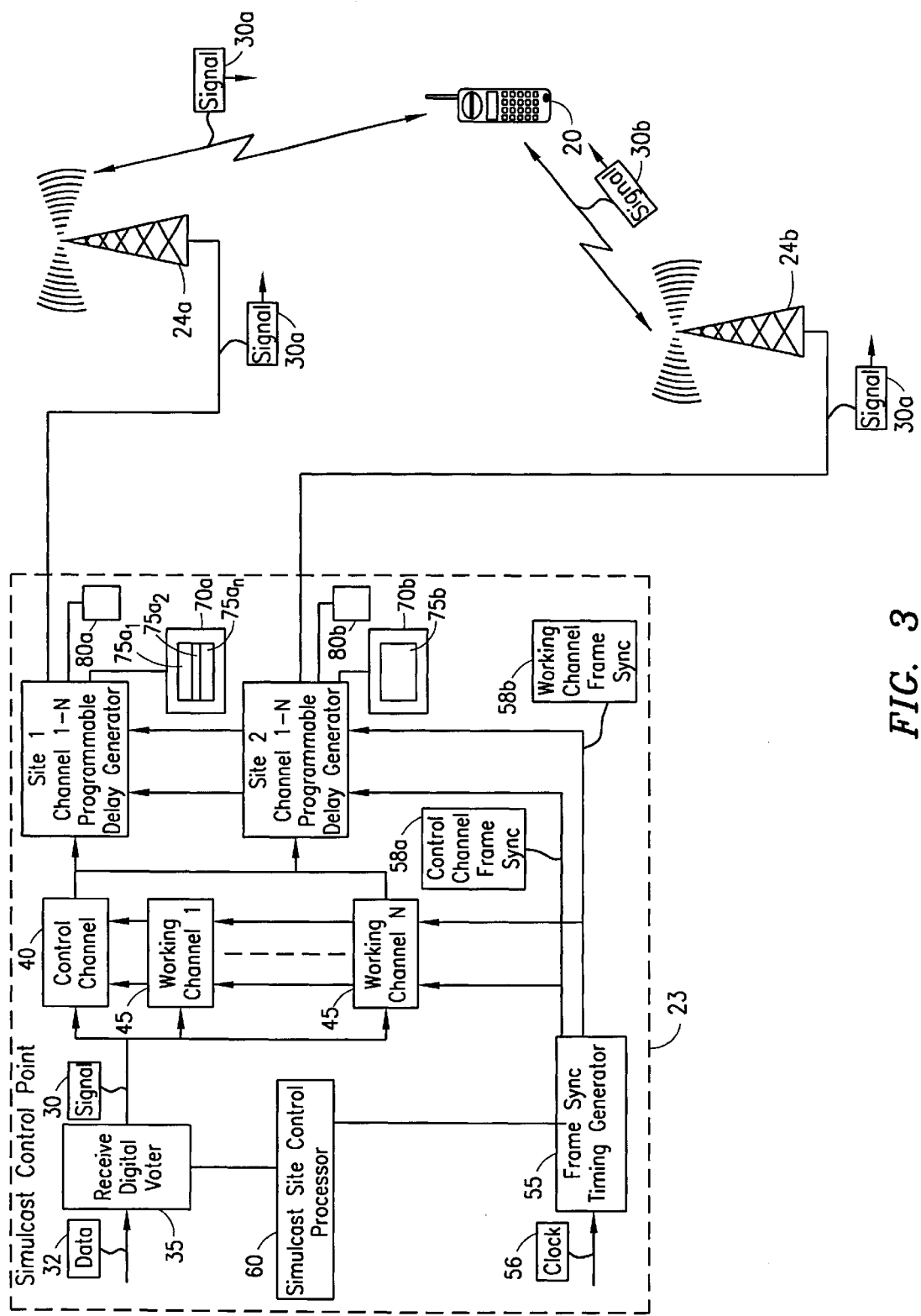
FIG. 3 illustrates a sample implementation of the introduction of a timing jitter in accordance with preferred embodiments of the present invention.

With reference now to FIG. 3 of the drawings, a sample implementation of the introduction of the timing jitter within the control point 23 is shown. When the control point 23 receives data 32 to be transmitted to the MS 20, a digital voter circuit 35 within the control point 23 selects the best received data 32. Thereafter, the digitized data 32 is assigned to a channel, which can be either a control channel 40 for control information or a working channel 45, e.g., traffic channel, for speech or other type of data. The data 32 is also segmented into separate frames, in which one of these frames forms the signal 30 that is transmitted on the assigned channel 40 or 45 to the MS 20 via each of the transmitters 24a and 24b. Each signal 30 (whether included within the control channel 40 or within one of the working channels 45) is passed onto a separate programmable delay generator 50a and 50b for each of the transmitters 24a and 24b, respectively. A control processor 60 within the control point 23 coordinates the data 32 and signal 30 transmission process.

The transmission of the signals 30a and 30b from the control point 23 to each of the transmitters 24a and 24b, respectively, is controlled by a timing generator 55 and separate programmable delay generators 50a and 50b for each of the transmitters 24a and 24b, respectively. The timing generator 55 synchronizes to a master clock signal 56, and creates synchronization signals 58a or 58b to each of the programmable delay generators 50a and 50b. It should be understood that the timing generator 55 transmits two separate synchronization signals 58a and 58b, one for control channel 40 transmission and one for working channel 45 transmissions, respectively. This is due to the fact that the control channel 40 frame size, e.g., the number of bits transmitted over the control channel 40 per frame, is different than the working channel 45 frame size. For example, in the EDACS system, one control channel 40 frame is thirty milliseconds (msec) long and contains 288 bits, while the working channel 45 frame is eighty msec long.

The programmable delay generators 50a and 50b transmit the signals 30a and 30b to each of their respective transmitters 24a and 24b based upon the delay associated with each of the transmitters 24a and 24b. For example, if the first transmitter 24a is closer to the control point 23 than the second transmitter 24b, the second programmable delay generator 50b typically transmits the signal 30b to the second transmitter 24b immediately upon reception of the synchronization signal 58a or 58b. In other words, the delay time for the second programmable delay generator 50b is zero. In order to ensure that the signals 30a and 30b are received by all of the transmitters 24a and 24b at the same time, the first programmable delay generator 50a can delay the transmission of the signal 30a to it's respective transmitter 24a for a predefined time period.

However, if a timing jitter is introduced into the system 10, the programmable delay generators 50a and 50b can adjust the delay time for the transmission of the signals 30a and 30b to each of the transmitters 24a and 24b. In preferred embodiments of the present invention, each of the programmable delay generators 50a and 50b can continuously cycle through a respective set of values 75a and 75b stored in a respective memory 70a and 70b, changing values every time a synchronization signal 58a or 58b is received. The set of values 75a and 75b for each programmable delay generator 50a and 50b, respectively, could be stored in, for example, a respective look-up table 70a and 70b. Each programmable delay generator 50a and 50b can access its respective table 70a and 70b and increment a respective counter 80a and 80b associated with the respective table 70a and 70b every time a synchronization signal 58a or 58b is received.

For example, considering only the first programmable generator 50a, when a first synchronization signal 58a or 58b is received by the first programmable delay generator 50a, the counter 80a associated with that first programmable delay generator 50a is initialized, and the first programmable delay generator 50a retrieves the first delay value $75a_1$ in the table 70a. The first programmable delay generator 50a uses this delay value $75a_1$ to determine the delay time for transmission of the signal 30a to the first transmitter 24a associated with the first programmable delay generator 50a. When the first programmable delay generator 50a retrieves the delay value $75a_1$, the counter 80a is incremented by one to indicate to the first programmable delay generator 50a that a second delay value $75a_2$ in the table 70a should be retrieved next. Therefore, when the next synchronization signal 58a or 58b is received by the first programmable delay generator 50a, the first programmable delay generator 50a retrieves the second delay value $75a_2$ from the table 70a, and uses this delay value $75a_2$ to delay the transmission of the next signal 30a to the transmitter 24a. This process continues until the first programmable delay generator 50a retrieves the last delay value $75a_n$ in the table 70a. Thereafter, the counter 80 is reinitialized, and the first programmable delay generator 50a retrieves the first delay value $75a_1$ from the table 70a when the next synchronization signal 58a or 58b is received.

In an alternative embodiment, these timing jitters can be implemented such that a separate delay time can be utilized for each channel 40 and 45. In this case, a separate look-up table 70a and 70b and counter 80a and 80b would be required for each channel 40 and 45. Thus, each programmable delay generators 50a and 50b would have multiple look-up tables 70a and 70b and counters 80a and 80b for each channel 40 and 45 within the system 10. Advantageously, by implementing the timing jitters on a channel by channel basis, the timing jitters can be selectively applied only to those channels experiencing difficulty. For example, if an MS 20 receives a corrupted signal 30 (due to interference), the MS 20 normally requests retransmission of the corrupted signal 30. Upon receipt of this retransmission request, the control processor 60 within the control point 23 can request the programmable delay generators 50a and 50b to access their respective look-up tables 70a and 70b for the channel 40 or 45 that the MS 20 is using and retrieve respective delay values 75a and 75b in order to shift the delay spread in the overlap zone 25 for the MS 20, which should put the MS 20 in a better position to correctly receive that signal 30.

Each time the delay spread in the overlap zone 25 is shifted by varying the transmission delay of the signal 30a and 30b from the control point 23 to the transmitters 24a and 24b, there is a possibility that the performance for some MS's 20 that are not located in an area of excessive delay spread in the overlap zone 25 may degrade. Therefore, these timing adjustments must be performed fast enough so as to not be noticed by MS subscribers. In addition, these timing adjustments preferably cycle above and below the optimal timing values determined from the system coverage analysis.

Figure 4:
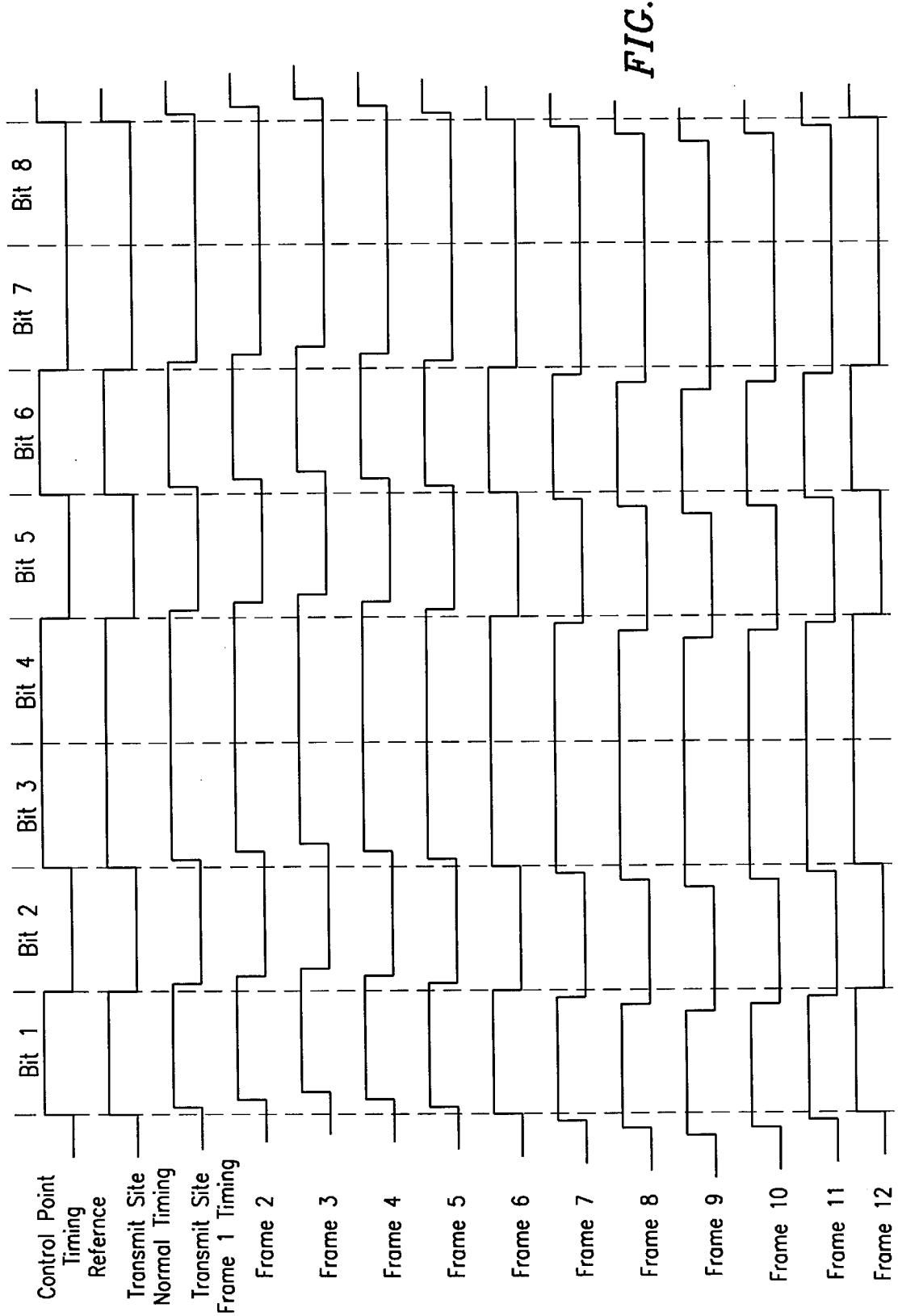
FIG. 4 illustrates an exemplary twelve frame jitter cycle produced by implementing a timing jitter in accordance with embodiments of the present invention.

A sample twelve frame jitter cycle for one programmable delay generator 50a is shown in FIG. 4 of the drawings. The control point timing reference and normal transmit times are compared with the transmit times of twelve separate frames, each containing eight bits. As can be seen in FIG. 4, the timing jitters cause frames 1–5 to be transmitted at a later time than the normal transmit time, while frames 7–11 are transmitted at an earlier time than the normal transmit time. Frames 6 and 12 correspond to the normal transmit times. By cycling the timing adjustments above and below the normal transmit time, the position in the overlap zone 25 where the delay spread is zero can be forced to constantly change relative to the transmitters 24a and 24b. In one cycle, the delay spread in the overlap zone 25 shifts away from the transmitter 24a and then back to the normal position, while in the next cycle, the delay spread in the overlap zone 25 shifts towards the transmitter 24a and then back to the normal position.

Ideally, these timing adjustments occur at specific boundaries, such as between control channel frames, or between working channel frames. For example, a control channel frame 30 typically contains 288 bits. When the MS 20 receives this control channel frame 30, most of the bits within the frame 30 supply a message to the MS 20, while other bits aid in bit error detection. If the programmable delay generator 50a transmitted the first half of one control channel frame 30, and delayed the transmission of the second half of the control channel frame 30, an MS 20 in an area with good reception at the beginning of the transmission may receive the first half, but lose the second half if the shift causes the MS 20 to be located near the edge of the overlap zone 25. Thus, the entire frame 30 would be considered corrupt by the MS 20, and the MS 20 would need to send a request for retransmission of the entire frame 30 to the transmitter(s) 24a. If the MS 20 is stationary, this situation could potentially keep occurring, which results in the MS 20 never receiving the entire frame 30 correctly.

However, if the timing jitter is initiated between the last bit of a first frame 30 and the first bit of a second frame 30, decoding errors can be minimized. For example, if the MS 20 is located in a poor reception area when the control channel frame 30 is first received, when the MS 20 requests retransmission of the corrupted frame 30, the timing differential will have shifted, which can potentially put the MS 20 in a location with improved reception capabilities. Thus, upon retry, if the MS's 20 location with respect to the delay spread in the overlap zone 25 has changed, the MS 20 should be able to receive the entire frame 30 correctly.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A control node for controlling the delay time of the transmission of a data signal to at least one transmitter within a simulcast mobile radio network, comprising:
    at least one programmable delay generator for receiving said data signal and a synchronization signal and transmitting said data signal to a respective one of said at least one transmitter within said simulcast cellular network;
    a memory associated with said at least one programmable delay generator having a plurality of delay values stored therein, said at least one programmable delay generator accessing said memory to obtain a select one of said plurality of delay values when said data signal and said synchronization signal are received by said programmable delay generator, said programmable delay generator delaying transmission of said data signal to said respective transmitter for an amount of time corresponding to said select delay value; and
    a counter associated with said memory, the value of said counter corresponding to the position of said select delay value within said memory, said programmable delay generator incrementing said counter after said select delay value is retrieved.

2. The control node of claim 1, further comprising:
    a timing generator for generating said synchronization signal and transmitting said synchronization signal to said at least one programmable delay generator.

3. The control node of claim 1, wherein said programmable delay generator retrieves an additional one of said plurality of delay values from said memory when said programmable delay generator receives a successive data signal and a successive synchronization signal, the position of said additional delay value within said memory corresponding to the current value of said counter.

4. The control node of claim 3 wherein said programmable delay generator continues to retrieve a successive one of said data values within said memory upon reception of an additional successive data signal and an additional successive synchronization signal, and to increment said counter upon retrieval of said successive data value, until a last one of said delay values in said memory is retrieved, said counter being reinitialized when said last delay value is retrieved to correspond to the position of said select delay value within said memory.

5. The control node of claim 1, wherein said memory comprises a look-up table.

6. The control node of claim 1, further comprising:
    at least one channel for transmitting said data signal, said data signal being assigned to a select one of said channels for transmission from said programmable delay generator to said respective transmitter.

7. The control node of said claim 6, wherein said memory contains a separate set of delay values for each said channel.

8. The control node of claim 6, wherein said at least one channel is a control channel.

9. The control node of claim 6, wherein said at least one channel is a working channel.

10. The control node of claim 6, wherein said data signal comprises a frame of data.

11. A simulcast system for implementing a timing jitter to change the timing differential for transmission of a data signal to a mobile station within said simulcast system, comprising:
    at least two transmitters for transmitting said data signal to said mobile station; and
    a control node connected to said at least two transmitters for dynamically shifting a delay spread within an overlap zone between said at least two transmitters by delaying transmission of said data signal from said control node to each of said at least two transmitters by respective delay values, said respective delay values being stored in respective memories, the position of each of said respective delay values within said respective memories corresponding to the value of respective counters associated with said respective memories, said counters being incremented after said respective delay values are retrieved from said respective memories.

12. The system of claim 11, further comprising:
    at least two programmable delay generators within said control node, each of said at least two programmable delay generators being associated with a respective one of said at least two transmitters, each of said programmable delay generators retrieving said associated respective delay value for said data signal and delaying the transmission of said data signal to said respective transmitter for a time period corresponding to said associated respective delay value.

13. A method for controlling the delay time of the transmission of a data signal from a control node to a mobile station via at least two transmitters within a simulcast system, comprising the steps of:
    initializing a counter associated with a memory that is associated with at least one programmable delay generator within said control node, said memory storing a plurality of delay values;
    receiving said data signal and a synchronization signal at said control node;
    retrieving, by said at least one programmable delay generator, a select one of said plurality of delay values from the position in said memory corresponding to the value of said counter, said counter being incremented after said select delay value is retrieved;
    delaying, by said programmable delay generator, transmission of said data signal to a respective one of said at least two transmitters for an amount of time corresponding to said select delay value; and
    transmitting said data signal from each of said at least two transmitters to said mobile station.

14. The method of claim 13, further comprising the step of:

generating, by a timing generator within said control node, said synchronization signal; and transmitting said synchronization signal from said timing generator to said at least one programmable delay generator.

15. The method of claim 13, wherein said steps of receiving, retrieving, delaying and transmitting are continuously repeated for successively received data signals and synchronization signals, successive ones of said data values within said memory being retrieved until a last one of said delay values in said memory is retrieved, and further comprising the step of:

reinitializing said counter when said last delay value is retrieved to correspond to the position of said select delay value within said memory.

16. The method of claim 13, wherein said step of delaying further comprises the step of:

assigning said data signal to a select channel for transmission of said data signal from said programmable delay generator to said respective transmitter.

* * * * *